US009501756B2

(12) United States Patent
Stevens et al.

(10) Patent No.: US 9,501,756 B2
(45) Date of Patent: Nov. 22, 2016

(54) SYSTEM AND METHOD FOR CONFIGURING WORKSTATIONS

(71) Applicant: Amazon Technologies, Inc., Reno, NV (US)

(72) Inventors: Rob Stevens, Arlington, MA (US);
William J. Watt, Wakefield, MA (US);
Timothy Bragg, Woburn, MA (US);
Nicholas Cravalho, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 203 days.

(21) Appl. No.: 14/333,087

(22) Filed: Jul. 16, 2014

(65) Prior Publication Data

US 2014/0330425 A1 Nov. 6, 2014

Related U.S. Application Data

(63) Continuation of application No. 13/216,394, filed on Aug. 24, 2011, now Pat. No. 8,805,574.

(51) Int. Cl.
*G06F 7/00* (2006.01)
*G06Q 10/08* (2012.01)

(52) U.S. Cl.
CPC ................................. *G06Q 10/087* (2013.01)

(58) Field of Classification Search
None
See application file for complete search history.

(56) References Cited

U.S. PATENT DOCUMENTS

| | | | |
|---|---|---|---|
| 6,289,260 B1 | 9/2001 | Bradley et al. | 700/216 |
| 7,894,932 B2 | 2/2011 | Mountz et al. | |
| 7,894,933 B2 | 2/2011 | Mountz et al. | 700/214 |
| 2004/0249497 A1* | 12/2004 | Saigh | E04H 14/00 700/216 |
| 2007/0293978 A1 | 12/2007 | Wurman et al. | |
| 2009/0185884 A1* | 7/2009 | Wurman | B65G 1/1378 414/270 |
| 2010/0241269 A1 | 9/2010 | Ham et al. | 700/214 |

OTHER PUBLICATIONS

U.S. Appl. No. 13/343,458, filed Jan. 4, 2012, Daniel T. Brunner.
USPTO; Office Action for U.S. Appl. No. 13/343,458 in the name of Daniel T. Brunner, et al.; 40 pages, Mar. 27, 2013.
"Snox Engineering Group—Customization picture," www.snox.com, Winter 2010, 1 page, 2010.

(Continued)

*Primary Examiner* — Yolanda Cumbess
(74) *Attorney, Agent, or Firm* — Baker Botts L.L.P.

(57) ABSTRACT

A method for managing an inventory system includes receiving an operation request that identifies an inventory item and selecting, from a plurality of workstations, a workstation at which to fulfill the operation request. The method also includes moving an inventory holder storing the identified inventory item to the selected workstation and moving a supply holder storing a supply item associated with the received operation request to the selected workstation. The method additionally includes fulfilling the operation request, at least in part, at the workstation.

15 Claims, 4 Drawing Sheets

(56) References Cited

OTHER PUBLICATIONS

USPTO; Response Pursuant to 37 C.F.R. §1.116; U.S. Appl. No. 13/343,458 in re: Daniel T. Brunner, et al.; 21 pages, Dec. 2, 2013.
USPTO; Final Office Action for U.S. Appl. No. 13/343,458 in re: Daniel T. Brunner, et al.; (42 pgs), Oct. 2, 2013.
USPTO; Response Pursuant to 37 C.F.R. §1.111; U.S. Appl. No. 13/343,458 in re: Daniel T. Brunner, et al.; 18 pages, Jun. 27, 2013.
USPTO; Non-Final Office Action for U.S. Appl. No. 13/343,458 in re: Daniel T. Brunner, et al.; (41 pgs), Mar. 27, 2013.
USPTO Notice of Allowance, U.S. Appl. No. 13/343,458 in re: Daniel T.. Brunner, et al., 25 pages, Jan. 17, 2014.
USPTO Request for Continued Examination, U.S. Appl. No. 13/343,458 in re: Daniel T. Brunner, et al., 1 page, Feb. 25, 2013.

* cited by examiner

SYSTEM AND METHOD FOR CONFIGURING WORKSTATIONS

RELATED APPLICATIONS

This application is a continuation of U.S. patent application Ser. No. 13/216,394, filed Aug. 24, 2011, and entitled "System and Method for Configuring Workstations."

TECHNICAL FIELD OF THE INVENTION

This invention relates, in general, to inventory systems and, more particularly, to a method and system for efficient delivery of supply items to a workstation.

BACKGROUND OF THE INVENTION

Modern inventory systems, such as those in mail-order warehouses, airport luggage systems, and custom-order manufacturing facilities, face significant challenges in responding to requests for inventory items. It may be particularly challenging to efficiently process operation requests that involve supply items in addition to inventory items. In inventory systems tasked with responding to large numbers of diverse operation requests, slow responses to operation requests may result in an ever-increasing backlog of operation requests. Additionally, in inventory systems where certain tasks are performed at only certain stations, overall efficiency is hampered as the rigid distribution of stations impedes throughput and adaptability.

SUMMARY OF THE INVENTION

In accordance with the present invention, the disadvantages and problems associated with inventory storage have been substantially reduced or eliminated. In particular, a mobile inventory system is provided that includes one or more mobile drive units capable of moving any of a plurality of inventory holders between locations within a physical space associated with the mobile inventory system.

In accordance with one embodiment of the present invention, a method for managing an inventory system includes receiving an operation request that identifies an inventory item and selecting, from a plurality of workstations, a workstation at which to fulfill the operation request. The method also includes moving an inventory holder storing the identified inventory item to the selected workstation and moving a supply holder storing a supply item associated with the received operation request to the selected workstation. The method additionally includes fulfilling the operation request, at least in part, at the workstation.

In accordance with another embodiment of the present invention, a method for managing an inventory system includes receiving a plurality of operation requests and initiating fulfillment of one or more of the plurality of operation requests. The method also includes detecting a trigger event while fulfilling one or more of the plurality of operation requests. Additionally, the method includes moving a supply holder storing a supply item associated with the trigger event to a workstation associated with the trigger event in response to detecting the trigger event.

Technical advantages of certain embodiments of the present invention include the ability to optimize the distribution and use of supplies in an inventory system. Additionally, certain embodiments may allow operators to request delivery of supplies or other items involved in processing operation requests to a particular workstation, or to customize a workstation based on user input, orders received, or a set schedule. Additionally, certain embodiments may provide a flexible and scalable inventory management solution that can be easily adapted to accommodate system growth and modification.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
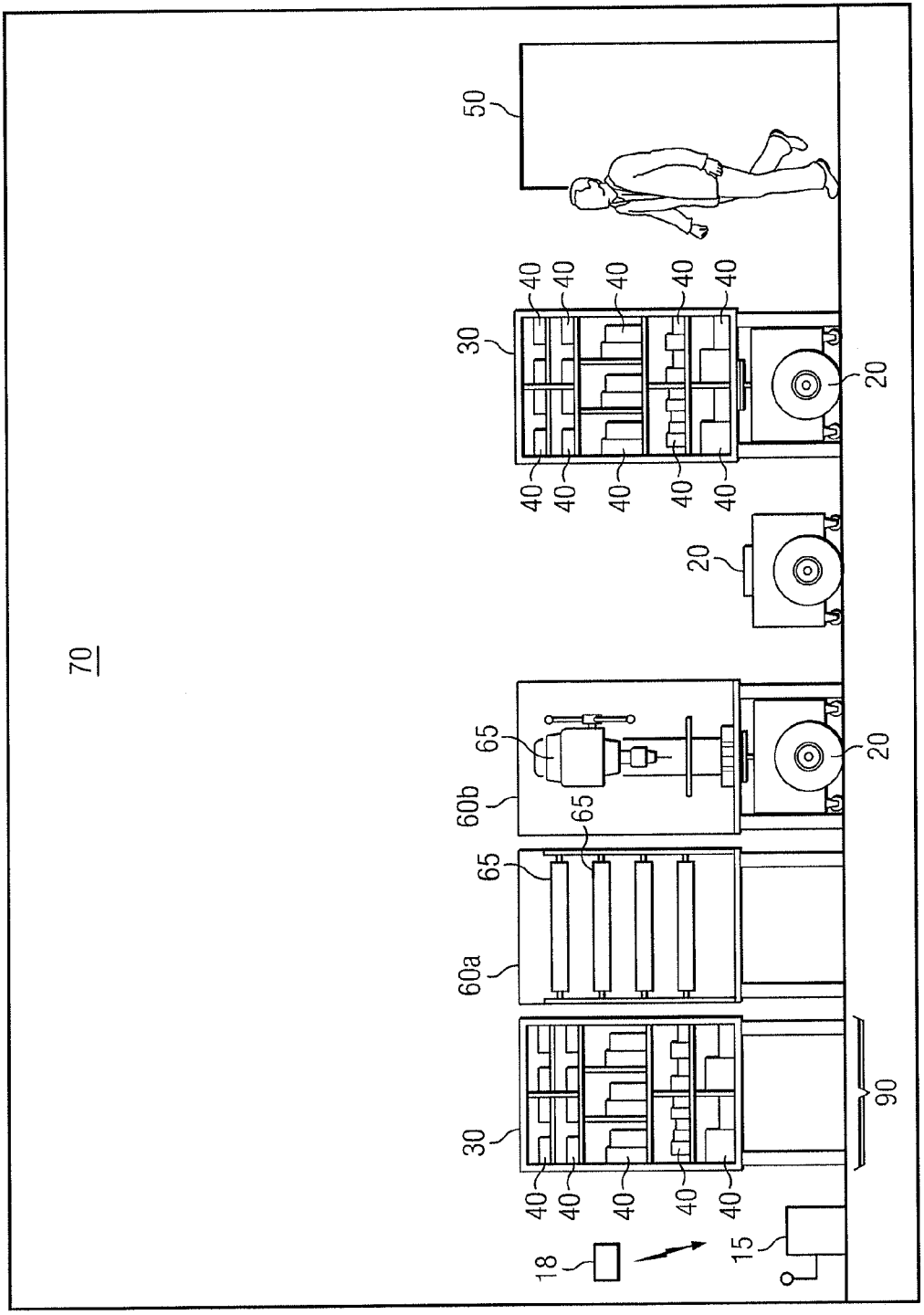
FIG. 1 illustrates components of an inventory system according to a particular embodiment.

FIG. 1 illustrates an inventory system 10 according to a particular embodiment of the present invention. Inventory system 10 includes a management module 15, one or more mobile drive units 20, one or more inventory holders 30, one or more inventory items 40, one or more workstations 50, one or more supply holders 60, and one or more supply items 65. Mobile drive units 20 transport inventory holders 30 storing inventory items 40 and supply holders 60 storing supply items 65 between locations within a workspace 70 in response to instructions communicated by management module 15. As a result, inventory system 10 may be capable of efficiently completing tasks that involve both inventory items 40 and supply items 65.

Management module 15 receives and/or generates operation requests 18 that initiate particular operations involving inventory items 40 and/or supply items 65 and transmits these operation requests 18 to appropriate components of inventory system 10. Management module 15 may select components of inventory system 10 to perform the operations and communicate appropriate commands and/or data to the selected components to facilitate completion of these operations. Although the description below focuses on embodiments of inventory system 10 that receive operation requests 18 from other components of inventory system 10, management module 15 may alternatively or additionally generate operation requests 18 itself using any appropriate techniques. In such embodiments, management module 15 may generate operation requests 18 based on a predetermined schedule of operations, in response to receiving a particular operation request 18, in response to detecting the occurrence of a particular event, or based on any appropriate considerations.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30 and supply holders 60. More generally, however, management module 15 may include any appropriate combination of hardware and/or software suitable to provide the described functionality and may further include components located on mobile drive units 20, workstations 50, or other elements of inventory system 10.

Mobile drive units 20 move inventory holders 30 and supply holders 60 between locations within workspace 70. Mobile drive units 20 may represent any devices or components appropriate for use in inventory system 10 based on the characteristics and configuration of inventory holders 30, supply holders 60 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system 10 configured to move inventory holders 30 and supply holders 60 along tracks, rails, cables, or other guidance elements traversing workspace 70. In such an embodiment, mobile drive units 20 may receive power through a connection to the guidance elements, such as a powered rail.

Additionally, mobile drive units 20 may be capable of communicating with management module 15 to receive information identifying selected inventory holders 30 and supply holder 60, transmit locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or any other appropriate wireless communication protocol. As another example, in a tracked inventory system 10, tracks or other guidance element upon which mobile drive units 20 move may be wired to facilitate communication between mobile drive units 20 and other components of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Inventory holders 30 store inventory items 40. In a particular embodiment, inventory holders 30 include multiple storage bins with each storage bin capable of holding a different type of inventory item 40. Inventory holders 30 are capable of being carried, rolled, or otherwise moved by mobile drive units 20. In particular embodiments, inventory holder 30 may provide additional propulsion to supplement that provided by mobile drive unit 20 when moving inventory holder 30.

Inventory items 40 represent any objects suitable for storage in and retrieval by inventory system 10. For the purposes of this description, "inventory item 40" may represent any one or more objects of a particular type that are stored in inventory system 10, while a "unit" of an inventory item 40 represents an individual object of that type. For example, in an inventory system 10 that stores books, a particular book title may represent an "inventory item 40" while each individual copy of that book may represent a "unit" of the inventory item 40. Thus, a particular inventory holder 30 is currently "storing" a particular inventory item 40 if the inventory holder 30 currently holds one or more units of that type. Similarly, two units of inventory may represent the "same" inventory item 40 if the units are of the same type.

As noted above, inventory items 40 may represent any objects suitable for storage in inventory system 10. As one example, inventory system 10 may represent a mail order warehouse facility, and inventory items 40 may represent merchandise stored in the warehouse facility. Mobile drive unit 20 may retrieve a particular inventory holder 30 containing one or more inventory items 40 requested in an order to be packed for delivery to a customer.

As another example, inventory system 10 may represent an airport luggage facility. In such an embodiment, inventory items 40 may represent pieces of luggage stored in the luggage facility. Mobile drive unit 20 may retrieve inventory holder 30 containing luggage arriving and/or departing on particular flights or luggage destined for particular types of processing, such as x-ray or manual searching.

As another example, inventory system 10 may represent a merchandise-return facility. In such an embodiment, inventory items 40 may represent merchandise returned by customers. Units of these inventory items 40 may be stored in inventory holders 30 when received at the facility. At appropriate times, a large number of units may be removed from a particular inventory holder 30 and packed for shipment back to a warehouse or other facility. For example, individual units of a particular inventory item 40 may be received and stored in inventory holders 30 until a threshold number of units of that inventory item 40 have been received. A pallet may then be packed with inventory item 40 and shipped to another facility, such as a mail-order warehouse.

As yet another example, inventory system 10 may represent a manufacturing facility, and inventory items 40 may represent individual components intended for inclusion in an assembled product, such as electronic components for a computer system. In such an embodiment, inventory system 10 may retrieve particular components so that a product associated with an order can be built. Alternatively, in particular embodiments, inventory system 10 may represent a reconfigurable assembly line in which each supply holders 60 hold equipment for a particular stage of assembly for one or more products manufactured by inventory system 10. The portable, reconfigurable nature of supply holders 60 may, in particular embodiments, allow inventory system 10 to dynamically assign tasks or stages of production to individual workstations 50 and allow inventory system 10 to adjust to variations in the output of the various stages of production. Although a number of example embodiments are described, inventory system 10 may, in general, represent any suitable facility or system for storing and processing inventory items 40, and inventory items 40 may represent objects of any type suitable for storage in a particular inventory system 10.

Workstations 50 represent locations designated for the removal of inventory items 40 from inventory holders 30, the introduction of inventory items 40 into inventory holders 30, the counting of inventory items 40 in inventory holders 30, and/or the processing or handling of inventory items 40 in any other suitable manner. Workstations 50 also represent locations where supply items 65 may be used to n facilitate the processing or handling of inventory items 40. Workstations 50 may also include or incorporate any appropriate components for processing or handling inventory items 40, such as scanners for monitoring the flow of inventory items 40 in and out of inventory system 10, communication interfaces for communicating with management module 15, and/or any other suitable components. Workstations 50 may be controlled, entirely or in part, by human operators or may be fully automated.

Although "workstation" as used in the following description refers to locations at which any appropriate processing operation supported by inventory system 10 may be completed, in particular embodiments of inventory system 10 supply holder 60 may carry particular supply items 65 to workstation 50 to facilitate the completion of tasks that may or may not be completed by workstations 50 that do not have access to the relevant supply items 65. Thus, in particular embodiments, supply items 65 may facilitate the creation of specialized workstations 50 that are capable of performing a dynamically changing set of operations based on the supply items 65 currently accessible to that workstation 50.

Supply holders 60 store supply items 65 that may facilitate completion of certain operations carried out by inventory system 10. By moving supply holders 60 to appropriate workstations 50, inventory system 10 may be capable of dynamically distributing supply items 65 within inventory system 10. In particular embodiments, supply holder 60 may include multiple storage bins with each storage bin capable of holding a different type of supply items 65. As a result, a particular supply holder 60 may, at a particular point in time, store multiple different types of supply items 65.

Supply items 65 represent any suitable objects that facilitate the completion of a particular operation at workstations 50. As one example, in particular embodiments of system 10, supply items 65 may represent exhaustible supplies used in the completion of tasks performed at workstations 50. Thus, in particular embodiments in which inventory system 10 represents a mail order warehouse facility, supply items 65 may represent or include invoices, gift-wrapping paper, tape, dunnage, envelopes, shipping containers, straps, desiccants, special sealants, labels, laminates, plaques, or any other appropriate object or objects suitable to be included in an outgoing package or container. Additionally, these exhaustible supplies may represent reusable supplies that are used in the completion of tasks performed at workstations 50, such as totes, bins, hangers, clips, bindings, tape, wrapping, or any other objects that are added to or removed from inventory item 40, and later stored within inventory system 10 for reuse in subsequent operations.

As another example, supply items 65 may represent machines, components, power supplies, batteries, parts, equipment, or tools appropriate for use at workstation 50. In particular embodiments in which inventory system 10 represents a manufacturing facility, workstation 50 may be dynamically configured using one or more supply items 65. In such embodiments, supply items 65, may represent or include engravers, etching machines, drills, saws, lathes, conveyors, or any other appropriate devices suitable to facilitate operations on inventory items 40 at workstation 50. Additionally, supply items 65 may represent items used in a kitting station, including tools, parts, components, materials, machines and associated working surfaces suitable to assemble inventory items 40. As a result, the use of a particular workstation 50 may be changed by transporting particular, or particular combinations of, supply items 65 to a particular workstation 50.

As yet another example, supply items 65 may represent items used to assist a human operator in performing operations at workstation 50. In such embodiments, supply items 65 may represent or include refreshments, trash cans, recycling bins, gloves, goggles, earplugs, towels, hygienic materials, and/or any other appropriate object or objects suitable to facilitate a human operator in performing operations at workstation 50. For example, in particular embodiments, one or more supply holders 60 may a supply item 65 representing a trash can or recycling bin, and inventory system 10 may be configured to circulate a supply holder 60 of this type to workstations 50 on a set schedule or at the request of operators. More generally, however, supply items 65 may include any appropriate objects used by workstations 50 or operators of workstations 50 in fulfilling operation requests generally, in fulfilling particular types of operation requests, or in fulfilling operation requests under certain circumstances.

Workspace 70 represents an area associated with inventory system 10 in which mobile drive units 20 can move and inventory holders 30 and supply holders 60 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 that are configured to operate within a workspace 70 that is of variable dimensions and/or arbitrary geometry.

In operation, management module 15 receives operation requests 18 that trigger particular operations within inventory system 10 including, but not limited to, operations associated with the retrieval, assembly, storage, replenishment, and counting of inventory items 40. Operation requests 18 may represent communication of any form suitable for inventory system 10 and may include any appropriate information identifying inventory items 40, supply items 65 and/or operations to be completed by inventory system 10. Furthermore, although the description below focuses on an embodiment of inventory system 10 capable of performing particular operations, a particular embodiment of inventory system 10 may be configured to perform any appropriate operation associated with the storage, processing, or removal of inventory items 40, and thus may receive operation requests 18 different from those described herein.

As noted above, management module 15 may receive operation requests 18 from a human operator or other components of inventory system 10. For example, an operator of inventory system 10 may manually enter operation requests 18 using a keyboard coupled to management module 15. As another example, management module 15 may receive operation requests 18 from remote components over a network connection, such as an internet connection. Additionally, management module 15 may receive operation requests 18 generated at workstation 50 or other elements of inventory system 10. Such operation requests 18 may be generated by a human operator or by a computer operating at workstation 50 or other element of inventory system 10 in response to the occurrence of a particular event or according to a predetermined schedule. Alternatively, management module 15 may itself generate operating requests. For example, management module 15 may be configured to initiate a particular operation based on a predetermined schedule or in response to the occurrence of a particular event, and may generate operation requests 18 accordingly. In general, management module 15 may receive or generate operation requests 18 in any suitable manner. For the sake of illustration, however, the description below assumes that management module 15 receives operation requests 18 from other elements of inventory system 10.

In response to receiving an operation request 18, management module 15 may select components or other elements of inventory system 10 to fulfill operation request 18. Depending on the type of operation requested, management module 15 may select a particular mobile drive unit 20, inventory holder 30, supply holder 60, workstation 50, storage space 90, and/or other suitable components and elements of inventory system to facilitate completion of the relevant operation request 18. Management module 15 may select the specific components for completing a particular operation request 18 based on any appropriate considerations. As one example, management module 15 may, in particular embodiments, select a particular inventory holder 30 to complete an operation based on factors including, but not limited to, its current distance from one or more mobile drive units 20, the various types of inventory items 40 stored by the selected inventory holder 30, its current location within workspace 70, other operation requests 18 the selected inventory holder 30 is currently being used to fulfill, and/or the availability of any supply items 65 that may be used in the operation. Similarly, management module 15 may, in particular embodiments, select a particular supply holder 60 to complete an operation based on a request for a particular inventory item 40, its current distance from one or more mobile drive units 20, the various types of supply items 65 stored by the selected supply holder 60, its current location within workspace 70, other operation requests 18 the selected supply holder 60 is currently being used to fulfill, and/or the availability of any supply items 65 that may be used in the operation. As another example, management module 15 may, in particular embodiments, select a mobile drive unit 20 to fulfill a particular task based on factors including, but not limited to, its distance from a selected inventory holder 30, a power supply level associated with the selected mobile drive unit 20, and/or its current activity. More generally, however, management module 15 may select suitable components to complete tasks associated with a particular operation request 18 based on any appropriate factors, considerations, or criteria.

After management module 15 selects suitable components and/or elements to complete operation request 18, management module 15 may then communicate information to the selected components indicating tasks to be completed by these components or their operators and/or identifying one or more of the other selected components involved in completion of the requested operation. For example, in the illustrated embodiment, management module 15 communicates one or more task requests 62 to selected components to communicate information regarding tasks to be completed by the receiving components and/or other components to be involved in completing the relevant tasks. Task requests 62 may represent communication of any suitable form to initiate completion of tasks by the receiving components, such as instructions, commands, and/or requests appropriately formatted for the receiving components.

Figure 2:
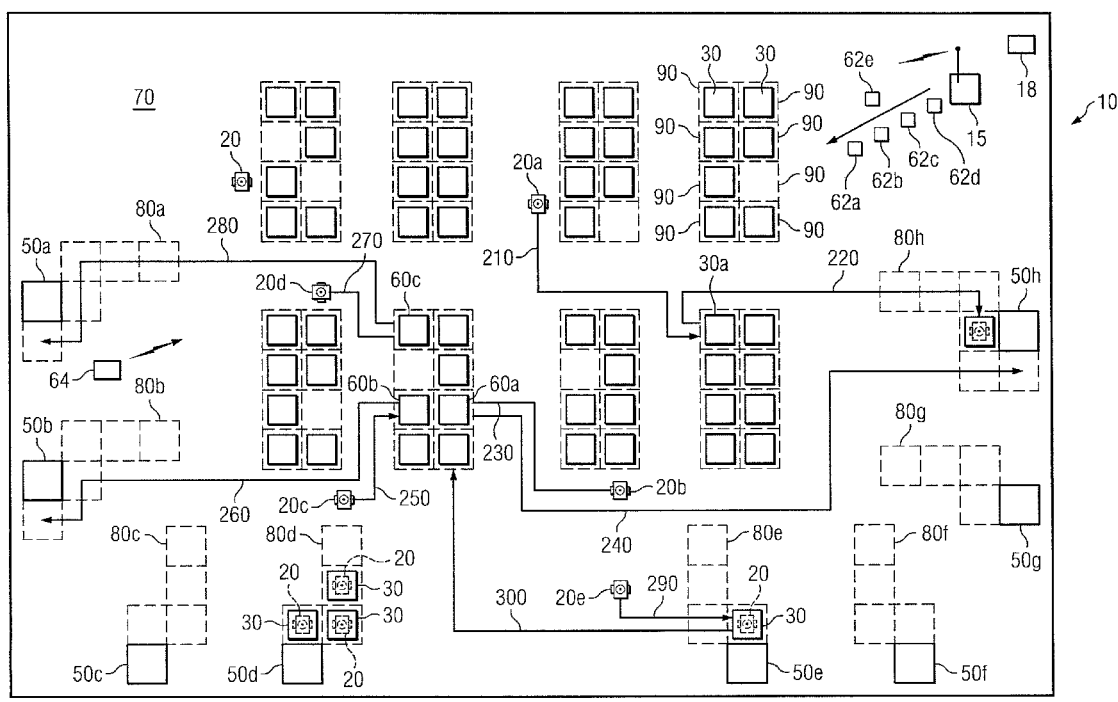
FIG. 2 illustrates operation of a particular embodiment of the inventory system while retrieving an inventory holder containing particular inventory items and while retrieving a supply holder carrying supply items.

The selected components may then utilize the received information to complete tasks associated with the relevant operation request 18. For example, based on instructions received from management module 15, a selected mobile drive unit 20 may move a selected inventory holder 30 to a selected workstation 50 so that an operator of the selected workstation 50 may pick requested inventory items 40 from the selected inventory holder 30 and pack them for shipment. Similarly, a selected mobile drive unit 20 may move a selected supply holder 60 carrying supply items 65 to a selected workstation 50 to enable an operator at workstation 50 to use supply items 65 to facilitate the processing or handling of inventory items 40. FIG. 2 illustrates further the operation of a particular embodiment of inventory system 10 in responding to particular types of operation requests 18.

When the selected supply holder 60 arrives at the selected workstation 50, inventory system 10 may configure the selected supply holder 60 for use or operation at the selected workstation 50. For example, in particular embodiments, the selected mobile drive unit 20 may position the selected supply holder 60 so that a power cord of supply holder 60 couples to an electrical outlet, battery, or other power supply located at the selected workstation 50. Similarly, mobile drive unit 20 may connect a hose of supply holder 60 to a supply for water, air, or any other expendable resource (e.g., for use by tools on supply holder 60). More generally, however, mobile drive unit 20 or other components of inventory system 10 may connect, open, activate, or otherwise configure supply holder 60 for use at workstation 50.

As indicated above, supply holders 60 may be transported to workstations 50 in response to any appropriate events and/or on any suitable schedule. Additionally, in particular embodiments, multiple supply holders 60 may be transported to a particular workstation 50 within a given time period so that a series of tasks may be carried out at the relevant workstation 50. Furthermore, the multiple supply holders 60 may be transported to the relevant workstation 50 in a particular order and/or arranged near the relevant workstation 50 in a particular configuration to facilitate an ordered series of tasks at the relevant workstation 50, to permit certain supply holders 60 to align with certain resources at the relevant workstation 50, and/or provide other benefits as these supply holders 60 are used to complete tasks at the relevant workstation 50.

As one example, in particular embodiments, a operation request 18 may request the completion of an ordered sequence of multiple tasks associated with a particular group of one or more inventory items 65, such as a series of steps in the manufacturing of a particular component. Each task may be associated with a supply item 65 stored by a different supply holder 60, and management module 15 may instruct mobile drive units 20 to position the supply holders 60 associated with the task at or near the relevant workstation 50 based on the predetermined order of the tasks. For example, in an electronic manufacturing system, an operator of a workstation 50 may assemble a computer circuit board by attaching a series of inventory items 40 representing computer chips, capacitors, memory elements, and other electronic components to a printed circuit board (PCB) using a particular order of tools and equipment. A first set of inventory items 40 may be soldered to the circuit board using a soldering iron carried by a first supply holder 60. A second set of inventory items 40 may be glued to the circuit board using a glue gun carried by a first supply holder 60. A third set of inventory items may be screwed to the circuit board using an electric screwdriver carried by a third supply holder 60 and a set of screws carried by a fourth supply holder 60. As a result, inventory holders 30 and supply holders 60 may queue at the relevant workstation 50 in a particular order based on this sequence of tasks to be completed. Thus, management module 15 may instruct the appropriate mobile drive units 20 to queue the supply holders based on the predetermined order in which the tasks will be completed so that mobile drive units 20 can move the first, second, third, and fourth supply holders 60 in order through a particular location adjacent to the relevant workstation 50 where operator can reach and utilize the supplies carried by supply holders 60. Alternatively, management module 15 may instruct mobile drive units 20 to position supply holders 60 at locations around the relevant workstation 50 based on the predetermined order in which the tasks will be completed (e.g., with each of the four supply holders 60 positioned on a different side of the workstation 50). This may allow an operator of the relevant workstation 50 to complete the tasks associated with assembling the computer card by turning from one position to the next with the circuit board in hand. More generally, management module 15 may instruct mobile drive units 20 to move supply holders 60 to the relevant workstation 50 and/or position supply holders 60 relative to the relevant workstation 50 in an appropriate manner based on a predetermined order in which tasks associated with these supply holders 60 will be completed.

As another example, supply holders 60 may be connect to, utilize, or otherwise interact with resources located at the relevant workstation 50. For example, a supply holder 60 carrying a power tool as one of its supply items 65 may connect to a supply for water, air, or any other expendable resource after being transported to the relevant workstation 50. As a result, if multiple supply holders 60 are to be transported to a particular work station 50 at a given time, management module 15 may instruct mobile drive units 20 to position these supply holder 60 in a particular manner to allow each supply holder 60 to connect to, utilize, or otherwise interact with the associated resources. Management module 15 may also instruct mobile drive units 20 to move these supply holders 60 to the relevant workstation in a particular order based on the resources associated with one or more of these supply holders 60 (e.g., if movement near the relevant workstation 50 is constrained by nearby equipment or other obstacles). More generally, management module 15 may instruct mobile drive units 20 to move supply holders 60 to the relevant workstation 50 and/or position supply holders 60 relative to the relevant workstation 50 in an appropriate manner based on a resource associated with one or more of these supply holders 60.

FIG. 2 is an overhead view illustrating example operation of a particular embodiment of inventory system 10 in responding to one or more operation requests 18 in which one or more types of inventory items 40 and supply items 65 are retrieved from and returned to storage spaces 90 in workspace 70. In the illustrated embodiment, workspace 70 includes multiple storage spaces 90, which represent physical locations where inventory holders 30 and supply holders 60 rest when not being used to respond to operation requests 18. In the embodiment of inventory system 10 illustrated by FIG. 2, inventory system 10 retrieves a selected inventory holder 30 from a storage space 90 and moves the selected inventory holder 30 to a selected workstation 50. Additionally, in response to a particular order received from a customer or the occurrence of some other trigger event, such as a predetermined time period elapsing or a supply request being received from a workstation 50, inventory system 10 may transport supply holders 60 to particular workstations 50 or to all workstations 50 to facilitate completion of operation requests 18 at the relevant workstations 50.

After the appropriate inventory items 40 have been picked from inventory holder 30, management module 15 may determine an appropriate storage space 90 for the selected inventory holder 30 and instruct an appropriate mobile drive unit 20 to move the relevant inventory holder 30 to the chosen storage space 90. Additionally, after a supply item 65 or supply item carried by supply holder 60 has been used in fulfilling the received operation request 18, inventory system 10 may determine an appropriate storage space 90 for the selected supply holder 60 and move the selected supply holder 60 to the chosen storage space 90. Although the description below describes inventory system 10 as performing a retrieval step and a storage step when responding to operation requests 18, inventory system 10 may, in a particular embodiment, be configured to perform operations when responding to retrieval requests.

In the illustrated example, management module 15 receives an operation request 18 that identifies one or more types of inventory items 40 to be retrieved from storage in inventory system 10. Operation request 18 may additionally identify one or more supply items 65 required to fulfill, complete, or otherwise facilitate processing of operation request. Depending on the configuration of inventory system 10, operation request may identify types of inventory items 40 to be retrieved, for example by specifying a product name, or specific inventory items 40, for example by identifying particular articles of luggage.

In response to receiving operation request 18, management module 15 may select components or other elements of inventory system 10 to fulfill operation request 18. Depending on the type of operation requested, management module 15 may select a particular mobile drive unit 20, inventory holder 30, workstation 50, supply holder 60 and/or other suitable components and elements of inventory system to facilitate completion of the relevant operation request 18. As noted above, management module 15 may select the specific components for completing a particular operation request 18 based on any appropriate considerations. After management module 15 selects suitable components and/or elements to complete operation request 18, management module 15 may then communicate information to the selected components indicating tasks to be completed by these components or their operators and/or identifying one or more of the other selected components involved in completion of the requested operation. For example, in the illustrated embodiment, management module 15 communicates task requests 62 to selected components to communicate information regarding tasks to be completed by the receiving components and/or other components to be involved in completing the relevant tasks. Task requests 62 may represent communication of any suitable form to initiate completion of tasks by the receiving components, such as instructions, commands, and/or requests appropriately formatted for the receiving components. The selected components may then utilize the received information to complete tasks associated with the relevant operation request 18.

In the illustrated example, management module 15 responds to one or more operation requests 18 by selecting a workstation 50, one or more inventory holders 30, one or more supply holders 60, and one or more mobile drive units 20 to fulfill operation request. As noted above, management module 15 may select these components based on any appropriate considerations. FIG. 2 illustrates an example in which management module 15 selects four mobile drive units 20 (shown as mobile drive units 20*a*, 20*b*, and 20*c*), one inventory holder 30 (shown as inventory holder 30*a*), and three supply holders 60 (shown as supply holders 60*a*, 60*b*, and 60*c*) to fulfill a received operation request 18 at a selected workstation (shown as workstation 50*a*, 50*b*, 50*c*, and 50*d*). After selecting the relevant components, management module 15 may communicate one or more task requests 62 to each of the selected mobile drive units 20 to facilitate transport of the selected inventory holders 30 and/or supply holders 60 to the selected workstation 50. The task requests 62 transmitted to each mobile drive unit 20 identify a selected inventory holder 30 or supply holder 60 in terms of its location or an identifier associated with the selected inventory holder 30 or supply holder 60. The selected mobile drive units 20 may then move to the selected inventory holders 30 (as shown by arrows 210, 230, 250, and 270) and dock with them. After docking, the selected mobile drive units 20 begin moving the selected inventory holders 30 and supply holders 60 towards the selected workstation 50 (as shown by arrows 220, 240, 260, 280).

More specifically, in response to receiving operation request 18a, identifying an inventory item 40 to be retrieved from inventory system 10. To fulfill operation request 18a, management module 15 selects an inventory holder 30 storing the identified inventory item 40 and communicates task request 62a to selected mobile drive unit 20a. Selected mobile drive unit 20a moves to selected inventory holder 30a, as shown by arrow 210 in FIG. 2, based on location or other information specified in task request 62a. Selected mobile drive unit 20a then couples to selected inventory holder 30a. After coupling to selected inventory holder 30a, selected mobile drive unit 20a moves to selected workstation 50h as shown by arrow 220 in FIG. 2.

In some embodiments of inventory system 10, some or all operation requests 18 may identify a supply item 65 that is useful or necessary in processing or handling the requested inventory item 40. Thus, in particular embodiments, supply items 65 are associated with particular selected operation requests 18. For example, in a mail-order warehouse embodiment of inventory system 10, an operation request may specify that a particular inventory item 40 to be packaged and shipped requires gift-wrapping paper. In such embodiments, supply item 65 represents gift-wrapping paper associated with a particular operation request. Supply item 65 may additionally represent workspace, structural support for gift-wrapping paper, and any additional equipment on supply holder 60 capable of facilitating the processing of inventory item 40. As another example, an operation request 18 may specify that an inventory item 40 to be packaged and shipped requires a pallet with particular straps, or that an inventory item 40 to be packaged and shipped requires particular supply items 65 such as desiccants, special sealants, and/or moisture control, or that a particular machine or tool, such as an engraver or etching machine is required to process a particular inventory item 40. As a further example, in a manufacturing center embodiment of inventory system 10, an operation request 18 may request customization and/or modification of a particular inventory item 40, and management module 15 may determine that a particular type of supply item 65 is needed to perform the requested customization or modification. As yet another example, an operation request 18 may request manufacture of a particular inventory item 40, and management module 15 may determine that a particular type of supply item 65 is needed to manufacture the requested inventory item 40.

In the example of FIG. 2, in response to determining that a supply item 65 is associated with a received operation request 18, management module 15 selects a supply holder 60a that carries the relevant supply item 65 and communicates task request 62b to selected mobile drive unit 20b. Selected mobile drive unit 20b moves to selected supply holder 60a, as shown by arrow 230 in FIG. 2, based on location or other information specified in task request 62b. Selected mobile drive unit 20b then couples to selected supply holder 60a and moves to selected workstation 50h as shown by arrow 240. Once in place at workstation 50h, an operator may use supply items 65 carried by supply holder 60 to facilitate the processing, handling, and/or completion of the operation.

In other embodiments of inventory system 10, an operation request may be generated by a particular workstation 50. In such embodiments, workstation 50 may communicate an operation request to management module 15, or may select a particular mobile drive unit 20 to perform an operation and may communicate an operation request directly to the selected mobile drive unit 20. Additionally, an operation request (referred to as a "supply request 64") may be generated at a particular workstation 50 in response to operator input, or in response to the occurrence of a trigger event. For example, an operator at workstation 50b may provide input into inventory system 10 by requesting a particular supply holder 60 or supply items 65. For instance, an operator may request refreshments by pressing a "refreshments" button, or may request goggles, earplugs, or gloves an operator may desire for a particular operation to be performed by pressing a relevant "goggles," "earplugs," or "gloves" button. In response to operator input, workstation 50 may communicate a supply request 64 directly to a mobile drive unit 20, or may communicate supply request 64 to management module 15. In the latter case, management module 15 then communicates a task request 62 to a selected supply holder 60 that carries the requested supply item 65. As another example, workstation 50 may generate a supply request 64 in response to an occurrence of a particular event. For instance, workstation 50 may include a supply holder 60 with a stock of supply items 65, such as power supplies included with a computer kit, dunnage to be included in packaging, tape to be used in sealing boxes, or hand wipes to assist in cleaning workstation 50. In such embodiments, workstation 50 may be configured to automatically generate a supply request to replenish the stock of supply items 65 in response to the item count, item weight, and/or any other appropriate threshold reaching a predetermined limit. Thus, inventory system 10 may automatically keep workstation 50 supplied with supply items 65 without necessitating operator input.

In the illustrated example, workstation 50b transmits a supply request 64 to management module 15. In response to receiving supply request 64, management module 15 selects a supply holder 60b that stores a supply item 65 requested by workstation 50b, and communicates task request 62c to selected mobile drive unit 20c. Selected mobile drive unit 20c moves to selected supply holder 60b, as shown by arrow 250 in FIG. 2, based on location or other information specified in task request 62c. Selected mobile drive unit 20c then couples to selected supply holder 60b, and moves to requesting workstation 50b as shown by arrow 260. Once in place at workstation 50b, an operator may use supply items 65 carried by supply holder 60 to facilitate the processing, handling, and/or completion of operations at workstation 50b or may resupply a stock of the requested supply item 65 at workstation 50b.

In other embodiments of system 10, supply requests 64 may be generated by management module 15 or workstations 50 according to a predetermined schedule. In such embodiments, certain supply holders 60 may be transported to workstations 50 at predetermined intervals. For instance, in mail-order warehouse embodiments of system 10, management module 15 may be configured to transport a particular supply item 65 to workstation each hour. In this example, supply item 65 may represent a trash bin or recycling bin transported to workstation 50. An operator at workstation 50 may then expect to dispose of trash material once every hour when supply holder 60 carrying supply item 65 is delivered. In a manufacturing center embodiment of inventory system 10, one or more supply items 65 representing tools or parts used in facilitating the assembly of inventory items 40 may be transported to workstation 50 at predetermined intervals. For instance, inventory system 10 may include dynamically configurable workstations 50 that may be changed by the hour, day, or other relevant time period according to the type of supply items 65 delivered to workstation 50. As an example, on day one, an operator at workstation 50 may be assigned to use a drill press and lathe, and on the second day, assigned to use an engraver, and on the third day, a drill press and lathe again. Thus, the particular configuration of workstation 50 may be configured to change daily according to a repeatable schedule. Management module 15 may then transport the selected supply holder 60 to workstation at regular intervals.

For example, in the illustrated embodiment, management module 15 determines that a particular supply item 65 should be delivered to a particular workstation 50 (here, workstation 50a) based on a predetermined schedule. As a result, management module 15 selects a supply holder 60c that carries the particular supply item 65 associated with the scheduled resupply, and communicates task request 62d to selected mobile drive unit 20d. Selected mobile drive unit 20d moves to selected supply holder 60c, as shown by arrow 270 in FIG. 2, based on location or other information specified in task request 62d. Selected mobile drive unit 20d then couples to selected supply holder 60c, and moves to selected workstation 50a as shown by arrow 280. Once in place at workstation 50a, an operator may use supply items 65 carried by supply holder 60c to facilitate the processing, handling, and/or completion of operations at workstation 50a or to resupply a stock of the relevant supply item 65 at workstation 50a.

After being delivered to the appropriate workstations 50, the selected supply holders 60 may be returned to storage or otherwise relocated within workspace 70. For example, in particular embodiments, management module 15 may initiate storage of a particular supply holder 60 after an operator of a workstation 50 indicates that the relevant supply holder 60 is no longer needed at that workstation 50. Additionally, workstations 50 themselves may initiate storage of supply holder 60, for example, by determining that supply items 65 carried by supply holder 60 are exhausted. Additionally, management module 15 may decide to store supply holder 60 after a mobile drive unit 20 and/or supply holder 60 have remained at a particular workstation 50 for a predetermined length of time.

To store a supply holder 60, management module 15 may select a storage space 90 based on any appropriate factors or considerations. In particular embodiments, management module 15 may group all supply holders 60 in close proximity, or may group supply holders 60 carrying particular supply items 65 in close proximity to associated inventory items 40. In general however, management module 15 may select an appropriate storage space 90 based on any relevant factors or considerations.

In the illustrated example, after selecting a storage space 90, management module 15 transmits task request 62e to mobile drive unit 20e. Task request 62e may include information identifying the selected storage space 90. Upon receiving task request 62e, mobile drive unit 20e moves to workstation 50e, as indicated in FIG. 2 by arrow 290. Mobile drive unit 20e then docks with supply holder 60d, and moves supply holder 60d to the selected storage space 90, indicated in FIG. 2 by arrow 300. Mobile drive unit 20e may then undock from supply holder 60d after arriving at the selected storage space 90. Mobile drive unit 20 may then move away from the selected storage space 90, leaving supply holder 60 in the selected storage space 90, and begin responding to other task requests 62.

Consequently, particular embodiments of inventory system 10 may provide an optimized system of distributing supply items 65 to facilitate the processing or handling of inventory items 40. This may improve the ability of operators at workstation 50 to increase the performance or throughput of inventory system 10 by dynamically creating or altering the functions performed at a particular workstation 50. In particular, operators at workstation 50 may be able to provide input into inventory system 10 allowing them to request supply items 65, rather than leaving workstation to search for supply items 65. Additionally, operators of inventory system 10 may dynamically configure the operations performed at workstation 50 without having to alter the layout of workspace 70. Thus, an operator at workstation 50 may be performing etching one day, and drilling on the next day. As a result, particular embodiments of inventory system 10 may provide significant operational benefits. Specific embodiments of inventory system 10, however, may provide some, none, or all of these benefits.

Figure 3:
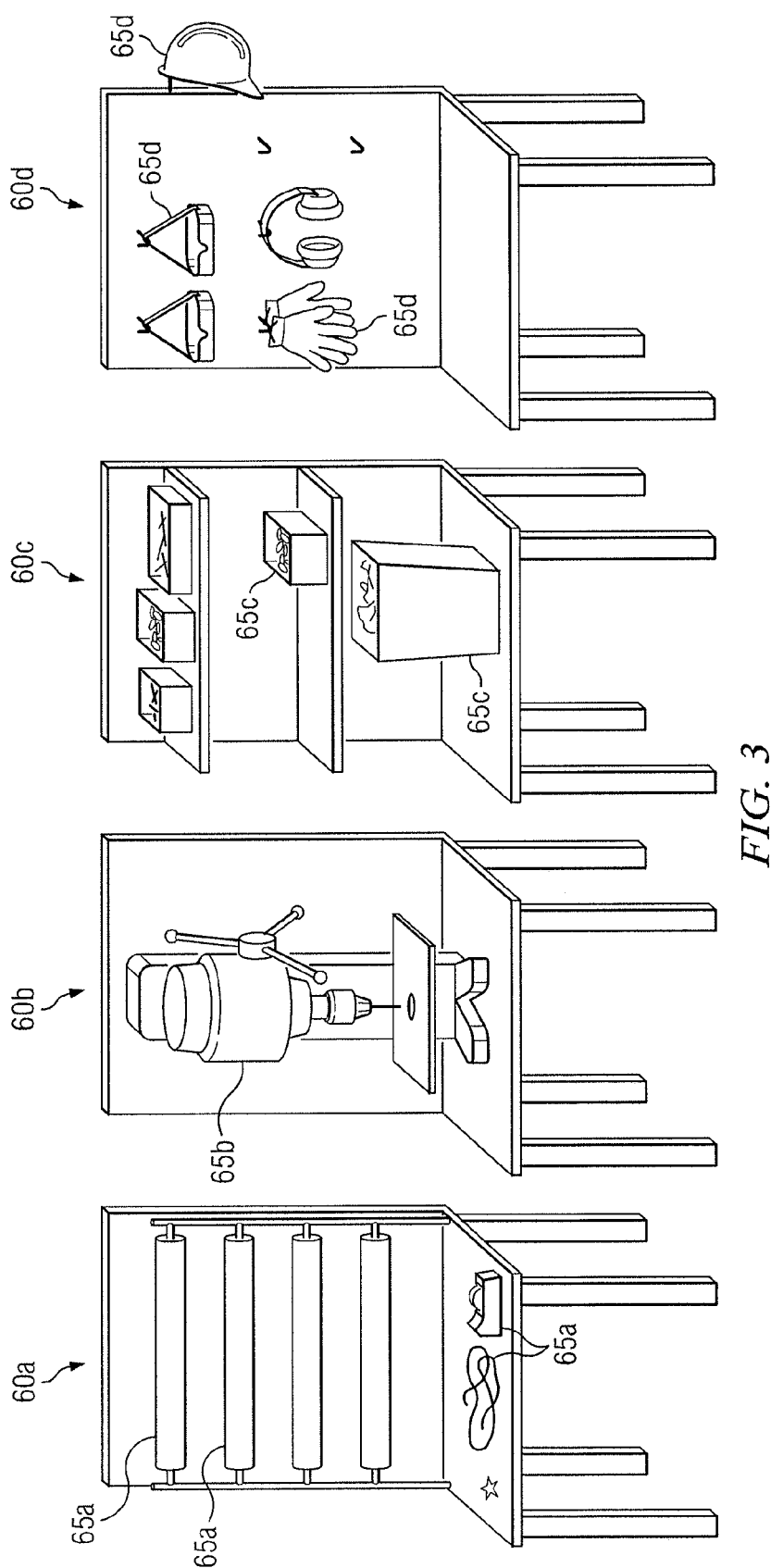
FIG. 3 illustrates particular embodiments of supply holders and supply items.

FIG. 3 illustrates example embodiments of supply holder 60 and supply items 65. Although particular examples are illustrated in FIG. 3, inventory system 10 may use other types of supply holder 60 and supply items 65. As shown in FIG. 3, supply holder 60a represents a platform with structural support for supply items 65a. In the illustrated embodiment, supply items 65a represent gift-wrapping paper, ribbons, cards, and tape. Collectively, supply holder 60a and supply items 65a may be referred to as a "gift-wrapping station." A gift wrapping station may be utilized in particular embodiments in which inventory system 10 represents a mail-order warehouse facility. In such embodiments, management module 15 may generate an operation request 18 in response to customer orders. As described above, management module 15 may select one or more inventory holders 30 containing inventory items 40 to fulfill a particular customer order. Additionally, if the customer order requires gift wrapping, management module 15 may select supply holder 60a, carrying supply items 45a (the gift-wrapping paper, ribbons, cards, and tape). Management module 15 then generates a task request 62 to instruct one or more mobile drive units 20 to transport inventory holder 30 and supply holder 60a to workstation 50. As a result, inventory items 40 and supply items 65a are available to an operator at workstation 50 to process. When an operator assembles a particular customer order, the operator may utilize workspace on supply holder 60a to gift wrap the inventory items 40. When completed, the operator may provide input into inventory system 10, signaling that gift-wrapping is complete. Input may be provided by manually entering a command on a keyboard coupled to workstation 50, by pressing a "gift wrapping complete" button, or by any other appropriate manner. In response, management module 15 may generate a task request 62, which instructs a mobile drive unit 20 to transport supply holder 60a to a storage space 90. Additionally, an operator at workstation 50 may provide additional input to inventory system 10 which signals that gift-wrapping paper or other exhaustible supply items 65a on supply holder 60 are running low. In response, management module 15 may select a mobile drive unit 20, and generate a task request 62, that instructs the selected mobile drive unit 20 to transport supply holder 60a to an area for supply items 65 to be replenished. Although FIG. 3 depicts a supply holder 60a and supply items 65 as one example of a supply holder 60 carrying gift-wrapping paper to workstation 50, particular embodiments of inventory system 10 may include any appropriate type of supplies, including, but not limited to, tape, dunnage, envelopes, shipping containers, straps, desiccants, special sealants, labels, laminates, and/or plaques.

As shown in FIG. 3, supply holder 60b represents a platform with a workspace area and structural support for supply items 65b. In this example, supply holder 60b carries a supply item 65b representing a drill press. Collectively, a supply holder 60b carrying supply items 65b may be referred to as a "tool station." In particular embodiments of inventory system 10 in which inventory system 10 represents a manufacturing center, a tool station may be utilized to perform operations on particular inventory items 40. In such cases, an operator at workstation 10 may provide input into inventory system 10, indicating that a tool station is required. Input may be provided by use of a keyboard coupled to workstation 50, by pressing a "drill press needed" button, or by any other appropriate manner. In response, management module 15 may generate a task request 62, which instructs a mobile drive unit 20 to transport supply holder 60b carrying supply item 65b (in this case, the drill press) to workstation 50. Once at workstation 50, an operator may utilize a workspace on supply holder 60 to perform operations using the supply item 65 on inventory item 40. In this example, an operator may use supply item 65b to drill one or more holes in an inventory item 40. Once completed, the operator may again provide input into inventory system 10 that signals that operation is complete. In response, management module 15 may generate a task request 62, which instructs a mobile drive unit 20 to transport supply holder 60b to a storage space 90. Additionally, one or more supply holder 60b may be utilized to dynamically configure the operation of workstation 50. For example, management module 15 may generate a task request 62 to one or more mobile drive units 20 to transport one or more supply holders 60 to workstation 50. At particular times during operation of inventory system 10, a workstation 50 may be configured to use a supply holder 60b to perform drill press operations, and another supply holder 60b to perform sanding operations. An operator of workstation 50 or management module 15 may dynamically configure the operations performed at workstation 50 by requesting different or additional supply holders 60. For instance, an operator may provide input into inventory system 10, signaling that the operator no longer needs a drill press or a sander, and needs a lathe and an etching machine. Management module 15 may then store supply holders 60 carrying the drill press supply item 65 and the sanding supply item 65 in storage area 90, and transport to workstation 50 a supply holder 60 carrying a lathe supply item 65 and a supply holder carrying an etching machine supply item 65, in the manner described with respect to FIG. 2. In other embodiments, workstation 50 may be dynamically configured according to a predetermined schedule. That is, particular supply holders 60 may arrive and depart workstation 50 without regard to operator input. In this manner, workstation 50 may be dynamically configured to support multiple types of operations, and may be so configured based on any appropriate factors or considerations. Although FIG. 4 depicts a supply holder 60b and supply items 65b as one example of a supply holder 60 carrying a drill press supply item 65, particular embodiments of inventory system 10 may include any appropriate type of tools, machines, components, and/or other equipment, including, but not limited to, engravers, etching machines, drills, saws, lathes, conveyors, or any other appropriate device suitable to facilitate operations on inventory items 40 at workstation 50.

As shown in FIG. 3, supply holder 60c represents a platform with a workspace area and structural support for supply items 65c. In this example, supply items 65c represent containers for removal of items from workstation 50. In particular embodiments of inventory system 10, an operator at workstation 50 may remove items from inventory item 40 as inventory items 40 are processed. In such embodiments, an operator may provide input into inventory system 10, requesting a supply holder 60c that carries supply items 65c. Additionally, management module 15 may select a supply holder 60c carrying supply items 65c based on the operation performed at workstation 50, or any other appropriate considerations. Once in place at workstation 50, the operator may then deposit items into supply items 65c, and provide input into inventory system 10 when the supply items 65c are full. Management module 15 may then generate a task request 62, instructing a mobile drive unit 20 to transport supply holder 60 to another area of workspace 70 where the supply items can be emptied or otherwise disposed of. In some embodiments of inventory system 10, items removed from inventory items 40 may be reused by inventory system 10 in other areas of workspace 70. Additionally, management module 15 may generate a task request 62, instructing a mobile drive unit 20 to transport a supply holder 60c to workstation 50, as described above. Although FIG. 3 depicts a supply holder 60c and supply items 65c as one example of a supply holder 60 carrying supply items 65c representing containers for removing items, particular embodiments of inventory system 10 may include any appropriate types of containers or storage bins, including, but not limited to, trash cans, recycling bins, shredding machines, and/or any other appropriate device suitable to facilitate operations on inventory items 40 at workstation 50.

As shown in FIG. 3, supply holder 60d represents a platform with structural support for supply items 65d. In this example, supply items 65d represent gloves, goggles, ear plugs, towels, sanitary wipes and other items designed to assist an operator in performing particular operations at workstation 50. In particular embodiments of inventory system 10, an operator at workstation 50 may require articles of clothing or other items designed to facilitate operations at workstation 50. In such embodiments, an operator may provide input into inventory system 10, requesting gloves, goggles, ear plugs, towels or other supply items 65 carried on a supply holder 60d. Additionally, management module 15 may select a supply holder 60c carrying supply items 65c based on the operation performed at workstation 50, or any other appropriate considerations. For instance, if an operator requests a supply holder 60 carrying a table saw supply item 65, management module 15 may automatically generate a task request 62 instructing a mobile drive unit 20 to transport supply holder 60d carrying a gloves supply item 65d and a goggles supply item 65d to workstation 50. Additionally, an operator may provide input to inventory system 10, requesting a particular supply item 65. An operator may provide input by a keyboard coupled to workstation 50, by pressing a button configured to generate a predetermined operation request, or in any other appropriate manner. For instance, an operator may request goggles, earplugs, or gloves by pressing a "goggles," "earplugs," or "gloves" button at workstation 50. Although FIG. 3 depicts a supply holder 60d and supply items 65d as one example of a supply holder 60 carrying supply items 65c gloves, goggles, ear plugs, towels, sanitary wipes, particular embodiments of inventory system 10 may include any appropriate types of items suitable to facilitate operations on inventory items 40 at workstation 50.

Figure 4:
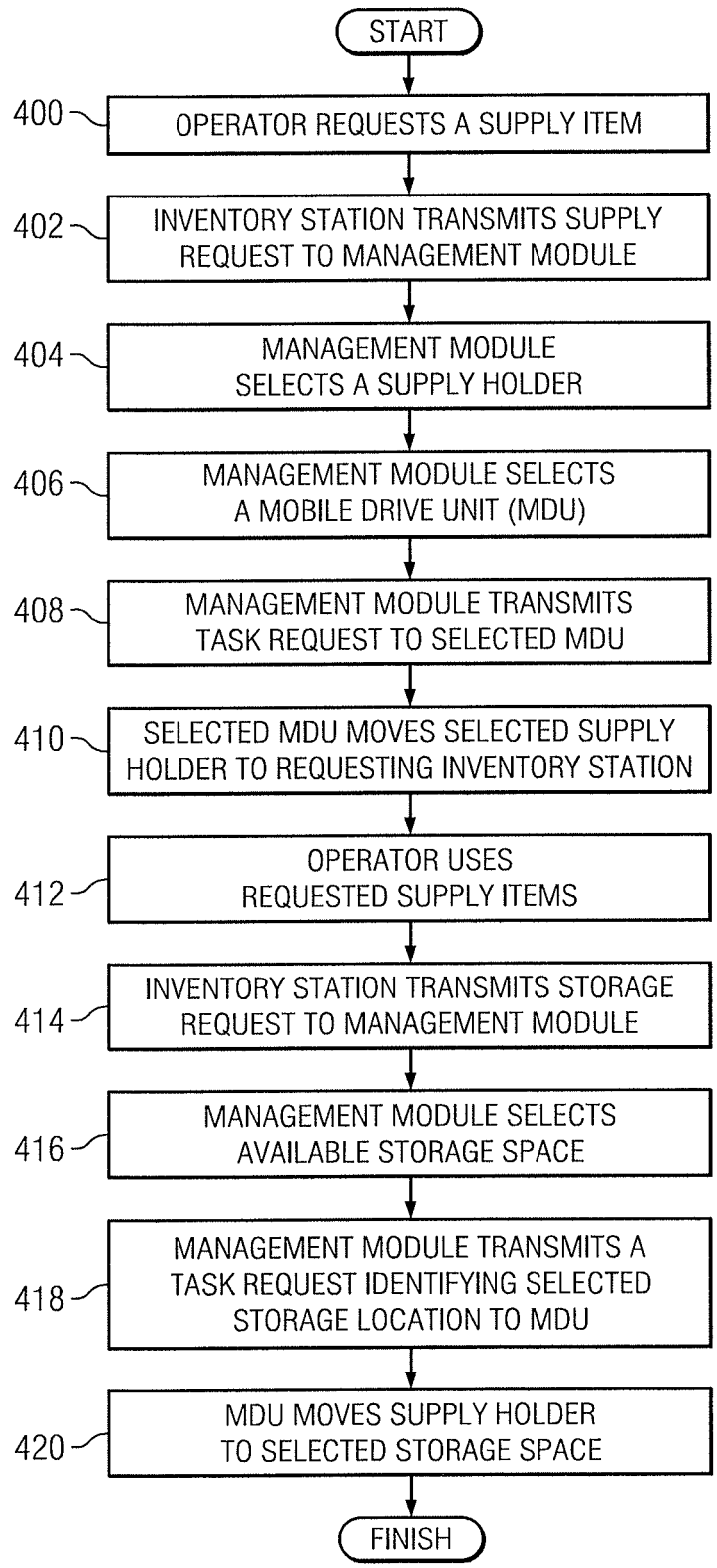
FIG. 4 illustrates operation of a particular embodiment of the inventory system while retrieving and storing inventory holders and supply holders.

FIG. 4 is a flowchart illustrating example functionality of a particular embodiment of inventory system 10 in transporting a supply holder 60 to a workstation 50 in response to operator-generated input. Although FIG. 4 illustrates a particular example of transporting a supply holder 60 to workstation 50, other embodiments may transport supply holders 60 to workstations 50 in response to received operation requests 18, in response to predetermined schedule, and/or in response to the occurrence of any appropriate trigger event.

Additionally, although FIG. 4 illustrates steps executed in a particular embodiment of inventory system 10, alternative embodiments of inventory system 10 may perform all, some, or none of these steps and may do so in any appropriate order. Moreover, any two or more of the steps illustrated in FIG. 4 may be combined, modified or deleted where appropriate and additional steps may also be added.

In the described embodiment, the process begins at step 400 with an operator requesting a particular supply item 65. For example, the operator may be preparing to perform a hazardous operation at workstation 50, and so requests goggles and gloves. The operator may request goggles and gloves by providing input to inventory system 10. An operator may provide input by a keyboard coupled to workstation 50, or may press a button configured to generate a predetermined operation request 18. For instance, the operator may press a "goggles" button to request goggles, and may press a "gloves" button to request gloves.

Operation continues in step 402 with the workstation 50 communicating an operation request 18 to management module 15. The particular operation request 18 is referred to herein as a "supply request 64." Workstation 50 may communicate supply request 64 to management module 15 through a wired connection to management module, through a wireless network, via radio frequencies, or by any other appropriate method. Additionally or alternatively, supply request 64 may be communicated to other elements of inventory system 10, including one or more mobile drive units 20.

At step 404, management module 15 receives supply request 64 and selects a supply holder 60 that carries the relevant supply items 65 to fulfill supply request 64. As noted above, management module 15 may utilize any appropriate criteria, factors, or considerations in selecting an appropriate supply holder 60. Examples of such factors may include, but are not limited to, the contents of supply holder 60, their location relative to workstations 50 or mobile drive units 20, existing assignments of supply holder 60, and/or any other appropriate factors.

At step 406, management module 15 selects a mobile drive unit 20 to move the selected supply holder 60 to workstation 50. As noted above, management module 15 may also select the mobile drive unit 20 based any appropriate factors, criteria, or considerations. Examples of such factors may include, but are not limited to, the location of mobile drive units 20 relative to workstation 50 or the selected supply holder 60. After selecting a supply holder 60 and a mobile drive unit 20, management module 15 transmits a task request 62, which contains information identifying workstation 50 and the selected supply holder 60, to the selected mobile drive unit 20 at step 408.

After management module 15 has transmitted task request 62 to the selected mobile drive unit 20 in step 408, the selected mobile drive unit 20 moves the selected supply holder to the requesting workstation 50 in step 410. In particular embodiments, the selected mobile drive unit 20 moves to the selected supply holder 60. The selected mobile drive unit 20 then couples to the selected supply holder 60. The selected mobile drive unit 20 then moves the selected supply holder 60 to the workstation 50. The operator located at the selected workstation 50 may then select or use the requested supply items 65 from the selected supply holder 60 in step 412.

In step 414, an operation request 18 may be generated at workstation 50 indicating that supply holder 60 is ready to be transported to storage space 90. The particular operation request 18 is referred to here as a "storage request." This storage request may be generated at workstation 50 in any appropriate manner. For example, the operator may provide input to workstation 50 indicating that the operator has removed supply items 65 from supply holder 60, or has in some other way finished using supply items 65. In the example described above, the operator may remove gloves and goggles from supply holder 60, and then signal that the gloves and goggles have been removed. For example, the operator may provide input by a keyboard coupled to workstation 50, or may press a button configured to generate a predetermined operation request 18 indicating that the operator no longer needs supply holder 60. Additionally, workstation 50 may generate a storage request after supply holder 60 has remained at workstation 50 for a predetermined length of time. As another example, in some embodiments of inventory system 10, supply holder 60 may be configured to detect when supply items 65 have been removed. In such embodiments, supply holder 60 itself may signal to workstation 50, management module 15 or other relevant component of workstation 50 that supply holder 60 is ready to be transported to storage space 90.

At step 416, management module 15 receives operation request 18 from workstation 50 and selects an available storage space 90 for the supply holder 60 to be stored. At step 418, management module 15 transmits a task request 62 including information identifying the selected storage location 90 to the mobile drive unit 20 that transported the relevant supply holder 60 or another selected mobile drive unit 20. After management module 15 has transmitted this information to the appropriate mobile drive unit 20, the relevant mobile drive unit 20 moves supply holder 60 to the selected storage location 90 at step 420. For example, in particular embodiments, the relevant mobile drive unit 20 moves the supply holder 60 to the selected storage location 90 and then uncouples from the supply holder 60. The relevant mobile drive unit 20 then moves away, leaving the supply holder 60 behind in the selected storage location 90.

Furthermore, although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:
1. An inventory system, comprising:
a first mobile drive unit operable to transport an inventory holder to a workstation, wherein the inventory holder stores an inventory item identified by an operation request;

a second mobile drive unit operable to transport a supply holder to the workstation, wherein the supply holder stores a supply item associated with the operation request, wherein the associated supply item is configured to facilitate processing of a container for the identified inventory item at the workstation;

a management module operable to initiate fulfillment of the operation request, at least in part, at the workstation; and wherein the associated supply item comprises one or more of:

gift wrap, wherein the supply holder is transported to the workstation in response to a selection of a gift wrapping option of the container; and a label operable to be applied to the container the label providing information sufficient to ship an order associated with the inventory item to a shipping destination specified by the order.

2. The system of claim 1, wherein the management module is further operable to select the workstation at which to fulfill the operation request from a plurality of workstations, the selection based on a capability of the workstation to process the container using the supply item.

3. The system of claim 1, wherein the first mobile drive unit is operable to move to a first location associated with the inventory holder, dock with the inventory holder at the first location by moving underneath the inventory holder and raising a docking head against a lower surface of the inventory holder, and move, while docked with the inventory holder, to the workstation.

4. The system of claim 1, wherein the second mobile drive unit is operable to move to a second location associated with the supply holder, dock with the supply holder at the second location by moving underneath the supply holder and raising a docking head against a lower surface of the supply holder, and move, while docked with the supply holder, to the workstation.

5. An inventory system, comprising:
a plurality of mobile drive units configured to process wireless instructions and including at least a first mobile drive unit and a second mobile drive unit; and
a management module configured to transmit wireless instructions to the plurality of mobile drive units, the management module operable to:
determine, based at least in part upon an order, to process a container associated with the order using a supply item;
identify, based at least in part upon the order, an inventory item requested by the order and an inventory holder storing the inventory item;
transmit a first wireless instruction to the first mobile drive unit that initiates the first mobile drive unit to transport the inventory holder storing the identified inventory item to a workstation;
transmit a second wireless instruction to the second mobile drive unit that initiates the second mobile drive unit to transport a supply holder storing the supply item to the workstation; and
wherein the supply item is configured to facilitate processing the container from a first state into a second state at the workstation; and
wherein the supply item comprises one or more of:
gift wrap and wherein the first state comprises an unwrapped state and the second state comprises a wrapped state; and
a label operable to be applied to the container.

6. The system of claim 5, wherein the management module is further operable to initiate movement of a supply holder by:
selecting, from a plurality of supply holders, the supply holder storing the supply item; and
initiating movement of the second mobile drive unit to transport the selected supply holder to the workstation.

7. The system of claim 5, wherein the management module is operable to initiate movement of the inventory holder by:
instructing the first mobile drive unit to move to the inventory holder;
instructing the first mobile drive unit to dock with the inventory holder by moving underneath the inventory holder and raising a docking head against a lower surface of the inventory holder; and
instructing the first mobile drive unit to move, while docked with the inventory holder, to the workstation.

8. The system of claim 6, wherein the management module is operable to select a supply holder by selecting a supply holder based, at least in part, on a quantity of the supply item currently stored in the selected supply holder.

9. The system of claim 5, wherein the management module is further operable to initiate movement of the supply holder to a storage location after initiating movement of the supply holder to the selected workstation.

10. The system of claim 5, further comprising a plurality of supply holders, wherein the plurality of supply holders comprises:
a first supply holder storing a first supply item for a first task associated with the order; and
a second supply holder storing a second supply item for a second task associated with the order; and
wherein the management module is further operable to:
initiate movement of the first supply holder to the workstation; and
initiate movement of the second supply holder to the workstation.

11. A method for transporting items, comprising:
receiving an operation request that identifies an inventory item;
selecting, from a plurality of workstations, a workstation at which to fulfill the received operation request;
initiating movement of an inventory holder storing the identified inventory item to the selected workstation;
initiating movement of a supply holder storing a supply item associated with the received operation request to the selected workstation, wherein the associated supply item is reusable for a plurality of operation requests;
initiating fulfillment of the received operation request, at least in part, at the selected workstation, wherein the associated reusable supply item is configured to facilitate fulfilling the received operation request for the identified inventory item at the selected workstation; and
wherein the associated reusable supply item comprises a safety item configured to protect a human operator associated with the workstation during fulfillment of the received operation request.

12. The method of claim 11, wherein the associated reusable supply item comprises a waste container operable to receive waste materials generated at the workstation.

13. The method of claim 12, wherein initiating movement of the supply holder to the workstation is performed in response to receiving a request for the waste container.

14. The method of claim 11, wherein initiating movement of the supply holder comprises:

selecting, from a plurality of supply holders, the supply holder storing the supply item associated with the received operation request; and initiating movement of the selected supply holder to the selected workstation.

15. The method of claim 11, further comprising:

initiating movement of the inventory holder to a first storage area after initiating movement of the inventory holder to the workstation; and initiating movement of the supply holder to a second storage area after initiating movement of the supply holder to the workstation.

\* \* \* \* \*